United States Patent [19]

Penny, Jr. et al.

[11] Patent Number: 5,414,432
[45] Date of Patent: May 9, 1995

[54] POSITION LOCATING TRANSCEIVER

[75] Inventors: Robert E. Penny, Jr., Gilbert; Thomas J. Mihm, Jr., Mesa, both of Ariz.

[73] Assignee: Motorola, Inc., Schaumburg, Ill.

[21] Appl. No.: 51,584

[22] Filed: Apr. 22, 1993

Related U.S. Application Data

[63] Continuation of Ser. No. 845,904, Mar. 4, 1992, abandoned.

[51] Int. Cl.$^6$ .............................. G01S 1/02; G01S 3/02
[52] U.S. Cl. ..................................... 342/357; 342/44; 342/50; 342/463
[58] Field of Search ................. 342/42, 43, 44, 50, 342/51, 52, 59, 133, 146, 357, 454, 457, 463

[56] References Cited

U.S. PATENT DOCUMENTS

| | | | |
|---|---|---|---|
| 4,010,619 | 3/1977 | Hightower et al. | 405/191 |
| 4,240,079 | 12/1980 | Zhilin | 342/352 |
| 4,673,936 | 6/1987 | Kotoh | 342/51 |
| 4,751,512 | 6/1988 | Longaker | 342/357 |
| 4,819,053 | 4/1989 | Halavais | 342/353 |
| 4,819,860 | 4/1989 | Hargrove et al. | 228/668 |
| 4,833,477 | 5/1989 | Tendler | 342/389 |
| 4,918,425 | 4/1990 | Greenberg et al. | 340/539 |
| 4,932,910 | 6/1990 | Hayday | 441/11 |
| 4,975,707 | 12/1990 | Smith | 342/357 |
| 5,043,736 | 8/1991 | Darnell et al. | 342/357 |
| 5,102,360 | 4/1992 | Eycleshimer | 441/80 |
| 5,115,223 | 5/1992 | Moody | 340/573 |
| 5,119,504 | 6/1992 | Durboraw, III | 455/54.1 |

FOREIGN PATENT DOCUMENTS 0295678 6/1988 European Pat. Off. ........ H04Q 7/04
3419156 5/1984 Germany ........................ H04B 1/02

OTHER PUBLICATIONS

An article entitled "Combat Rescue. One Pass is All You Get. With PLS, One Pass is All You Need. PLS (Personnel Locator System)", published jointly by Cubic Defense Systems and Motorola, Inc., publication date unknown.

A Motorola publication entitled "An/PRC–112 Multi-Mission Transceiver", published by Motorola, Inc., Communications Division, Copyright 1991.

Primary Examiner—John B. Sotomayor
Attorney, Agent, or Firm—Robert M. Handy; Phillip E. Hall

[57] ABSTRACT

A hand-portable position locating radio has a geolocation (e.g. GPS) receiver providing local position and timing information from geolocation means (e.g. GPS or IRIDIUM satellites) and a local transceiver for sending local position and other information to a communication system (e.g., an IRIDIUM or MILSAT satellite). A data processor coupled to the local transceiver and receiver controls operation of the device, including storing local position information and separating signals broadcast by the communication system into those intended or not intended for the device. The radio prepares an emergency access message which it sends to the satellite communication system in a manner to insure rapid detection of the emergency signal and allocation of a clear channel and time slot for further communication.

21 Claims, 4 Drawing Sheets

POSITION LOCATING TRANSCEIVER

This application is a continuation of prior application Ser. No. 07/845,904, filed Mar. 4, 1992, now abandoned.

FIELD OF THE INVENTION

The present invention concerns an improved means and method for portable radios and, more particularly, position locating and reporting portable radios.

BACKGROUND OF THE INVENTION

There is an ongoing need for portable radios, especially hand-portable radios, that allow a user to communicate with an airborne or satellite transceivers, where the communication includes information on the location of the user. While such radios have many uses, they are especially important in emergencies or other situations where knowledge of the location of the radio by third persons is important.

Emergency and search and rescue radio location systems are known in the art. In one prior art arrangement known as the SARSAT System, an emergency radio transmitter continuously broadcasts a beacon signal at 406 MHz. The beacon signal is picked up and recorded by a SARSAT satellite moving in low earth orbit. Later on in its orbit, the SARSAT satellite passes over a command and control base station to which it downloads the recorded signals picked up from continuous transmitter.

The Doppler shift of recorded signal as it approached, crossed over and receded from the beacon transmitter is analyzed in the base station and the zero Doppler time determined. By knowing the orbital location of the SARSAT satellite at the zero Doppler time, a line of position of the beacon transmitter is found. After several passes an approximate slant range and approximate position of the beacon transmitter on the earth's surface can be determined. The approximate position is then communicated to a rescue unit which then commences a local area search. This approach has a number of weaknesses well known in the art. For example, the position of the emergency beacon transmitter is known only approximately and there is a substantial time lag between initiation of the emergency transmitter and the local position determination.

In another prior art emergency rescue system, a mobile emergency radio sends a signal directly to a local rescue unit to allow the local rescue unit to home in on the position of the emergency radio. While such units are effective, they suffer from a number of limitations well known in the art, as for example, the rescue unit must be within range of the radio (typically line of sight) before any indication of the presence of radio can be obtained, the rescue unit must carry direction finding equipment in order to home in on the radio, and considerable time may be required to locate the emergency radio.

In a third prior art emergency rescue system, a standard marine radio transceiver is coupled to a LORAN or OMEGA or satellite geolocation receiver provided with a speech synthesizer. When an emergency switch on the system is activated, the normal transceiver functions are disabled and it transmits a synthesized speech "Mayday" voice call and synthesized voice stating the latitude and longitude, on the emergency channel. Other information about the vessel or emergency may also be rendered in voice by the speech synthesizer and transmitted at the same time. A provision is made so that the emergency transmitter can be disabled remotely by a signal sent to the unit. A difficulty with this system is that it has very limited range, announces the position of the emergency unit in plain language by voice, takes a substantial time to communicate the position of the emergency unit and can be disabled by a remote signal.

Thus, there continues to be a need for an improved radio suitable for communication, especially one that automatically provides accurate information on its local position, and that communicates with a global communication network.

SUMMARY OF THE INVENTION

A mobile position locating radio has, in its most general form, a geolocation receiver for providing local position and timing information from geolocation means and a local transceiver coupled to the geolocation receiver for sending local position information to a world-wide communication system adapted to receive position location and other information from the radio. The geolocation information is provided by one or more satellites and the transceiver is adapted to communicate with a satellite communication system which may be the same or different than that employed for geolocation. In one embodiment, the radio accomplishes geolocation and communication using the same satellite system. A microprocessor is desirably provided coupled to the receiver and transceiver for controlling message format, timing and other operation of the radio.

In a preferred embodiment there is provided a means for controlling the transmitter to transmit signals during a time window selected in part from the accurate time determined from the signals received from the geolocation means or satellite communication system.

It is desirable that the radio initiate its emergency contact with the satellite communication system by transmitting an Emergency Access Message (EAM) overlapping a prescribed time window on a prescribed access channel. On receipt of the EAM the satellite communication system responds to the emergency message, providing information permitting the radio to align its transmit/receive periods to the satellite receive/transmit periods, and to identify the radio transmit and receive channels to be used for subsequent communication between the radio and the local satellite. The local satellite exchanging information with the radio forwards the emergency message to a designated base station having responsibility for further communication and rescue.

As used herein the words "base station", singular or plural, are intended to refer to a communication node able to communicate with the position locating radio via a satellite communication system or a combination of a terrestrial and satellite communication system. The base station may be fixed or mobile and earth-based or airborne or in orbit. The word "satellite", singular or plural, is intended to refer to one or more communication relay transceivers, in earth orbit. The satellite may be moving with respect to the earth or geostationary or a combination thereof, for example, some geostationary and some moving. The word "receiver", singular or plural, is intended to refer to a device for receiving electromagnetic radiation. The word "transceiver", singular or plural, is intended to refer to a device for both receiving and transmitting electromagnetic radiation. The word "geolocation" is intended to refer to information useful in determining local position, and the words "geolocation satellites" or "geolocation means" are intended to refer to transmitters capable of providing geolocation information. The word "mobile" in connection with the word "radio" is intended to refer to radios with internal energy sources able to be carried by humans and operated when disconnected from fixed apparatus, as for examples but not limited to hand-holdable radios and cellular radios. Such radios are usually free from permanent wired connection to fixed apparatus although they may be connected thereto part of the time for battery charging and/or data input and/or output.

DETAILED DESCRIPTION OF THE DRAWINGS

The present invention is described in terms of certain geolocation and communication satellite facilities, but this is merely for convenience of explanation and not intended to be limiting. As those of skill in the art will appreciate based on the description herein, the invented method and system are not limited to the particular geolocation and communication systems used for illustration and the present invention is not intended to be limited thereto and applies to other geolocation and communication systems as well.

Figure 1:
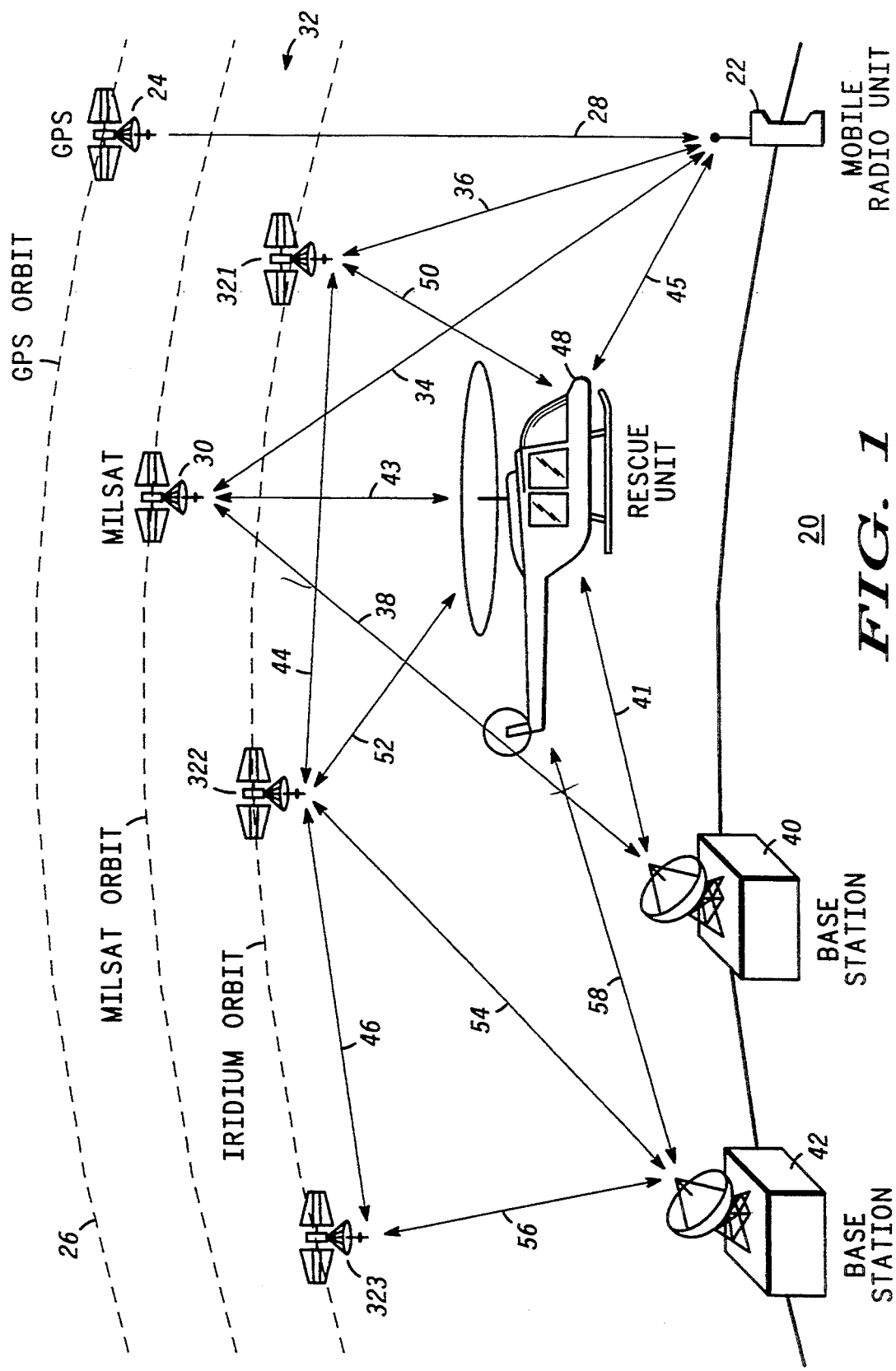
FIG. 1 illustrates a radio system used for search and rescue according to the present invention.

FIG. 1 illustrates cellular radio system 20 having position locating and emergency alarm and signalling capabilities, according to the present invention. System 20 comprises mobile radio unit 22 which receives geolocation information through, for example antenna 21, from satellites 24 (e.g., GPS Satellites) moving in orbit 26 via down-link 28 or from other satellites, and which communicates with other communication satellites, such as for example, MILSAT satellites 30 or IRIDIUM satellites 32, via bi-directional links 34, 36, respectively. For example, IRIDIUM Satellites 32 comprise multiple low earth orbiting satellites 321, 322, 323, etc. IRIDIUM satellites 32 are also capable of providing geolocation information. Satellites 30, 32 relay the message from radio 22 to their destinations, as for example, base stations 40, 42.

The well known MILSAT satellite system 30 is an example of a suitable communication satellite system. This system functions as a bi-directional relay transceiver, receiving signals from a transmitter in its antenna footprint and re-transmitting the signals to a receiver in its antenna footprint. For example, MILSAT 30 receives signals from radio 22 via link 34 and re-broadcasts those signals over link 38 to base station 40, and vice versa. MILSAT 30 typically listens on one set of UHF channels (e.g., 290 to 318 MHz) and re-transmits on another set of UHF channels (e.g., 240 to 270 MHz).

Such an arrangement is referred to in the art as a "bent pipe" communication channel. In order for it to function, both signal source and destination must be within line of sight of the MILSAT satellite at the same time. Since a number of MILSAT satellites are in position around the earth, a substantial portion of the earth's surface is covered. But, unless an intermediate relay is used, both the transmitter and receiver must be visible to the same satellite at the same time. Thus, in order to provide world-wide coverage a large number of monitoring (e.g. base stations) must be provided so that one is assured that one is always within the footprint of every MILSAT satellite. Once an emergency message has been communicated to base station 40, it may be relayed to rescue unit 48 via links 41 or 43. Once it is close enough, rescue unit 48 may communicate directly with radio 22 via link 45.

While MILSAT is suitable, other satellite or airborne transceivers may also be used, as for example but not limited to the IRIDIUM TM / SM satellite cellular communication system currently being developed by Motorola, Inc., of Schaumburg, IL. IRIDIUM system 32, which has been extensively described in the technical literature and elsewhere, provides for a number (e.g., 77) of satellites 321, 322, 323, etc. in low earth orbit arranged so as to provide substantially world-wide cellular radio coverage. For example, radio 22 which may be a satellite cellular radio with a geolocation and emergency message capability, contacts satellite 321 which is visible above the horizon of radio 22 through bi-directional link 36. Satellite 321 operates under control of one or more ground stations 42 (e.g., "gateways") located at different points around the earth. Satellite 321 receives and routes the message from radio 22 to the desired addressee wherever that addressee is located using routing information stored in the satellite and/or provided via gateway 42 from a central routing computer. For simplicity, it is assumed here that gateway 42 also functions as a base station for receipt of emergency messages, but they may be separate.

Satellite 321 may route the message from radio 22 over satellite-to-satellite links 44, 46 and link 56 to base station 42 or directly to rescue unit 48 via bi-directional link 50 or indirectly to base station 42 and/or rescue unit 48 via links 52, 54, 56, 58. A great virtue of the IRIDIUM system or other switched network satellite system is the great flexibility it provides for communicating with radio 22 since both origin and destination need not be within the footprint of any single satellite at the same time.

Thus, with the IRIDIUM System, radio 22 sending an emergency signal and base station 42 charged with receiving and reacting to emergency signals, may be located substantially anywhere in the world. Further, base station 42 need not itself be a satellite communication ground station (e.g., a gateway), but merely coupled to a gateway, as for example, by a terrestrial communication network. In this case, ground station 42 may be the local public safety agency or emergency "911" dispatch, or virtually any entity that is reachable by a terrestrial communication network coupled to satellite communication system 32.

Advantages of using a switched system such as system IRIDIUM over an unswitched system such as SATCOM is that world wide coverage is available without special relays, the sender and receiver may be located anywhere, the locations of the sender and receiver may change substantially without losing connection, different centers may be located in different parts of the world to deal with different types of emergencies, and the communication network may be used for ancillary communication with diverse users at the same time or, depending on the nature of the emergency, central network control may provide communication priority to the radio unit announcing an emergency in preference to other local radio units which may be remotely disabled if necessary to avoid interference or competition.

Mobile radio 22 receives information from geolocation satellite (or satellites) 24 via down-link 28. The well known Global Positioning System (GPS) satellites are a suitable source of geolocation information and are preferred, but other geolocation means may also be used. For example, the IRIDIUM and GLONASSS satellite systems also provide geolocation information. GPS satellites transmit typically in L band (e.g., 1.227 to 1.575 GHz) which is similar to the bands intended for the IRIDIUM system (e.g., 1610 to 1626.5 MHz) so that signals from GPS satellite 24 and IRIDIUM satellites 32 may be conveniently handled by a single antenna 21.

Based on the geolocation information received from geolocation means 24, radio 22 calculates its local position in some convenient coordinate system, as for example but not limited to, latitude and longitude. The accuracy of the geolocation information received from, for example, GPS satellites, is such that the local position of radio 22 may be determined typically to within about 25 to 100 meters. The accuracy of the position determined from GPS may depend upon whether or not the GPS system is functioning in its high or low resolution mode and/or whether the receiver is capable of decoding the high resolution mode. In any case, the accuracy with which the local position can be determined is much greater than that which would be obtained were geolocation system 24 (or 32) not utilized. Radio 22 then transmits this local position information over, for example, one or the other of links 34, 36 via satellites 30, 32 to stations 40, 42. GPS receivers and means and methods for processing GPS signals to obtain an accurate local position are well known in the art and GPS receivers are commercially available from numerous sources.

In a preferred embodiment, an acknowledgement signal is sent back to mobile unit 22. This may be done directly by satellite 321 or by base station 40, 42 or both, by whatever links are most convenient. It is desirable that processor 70 (see FIG. 2) cause by indication that an acknowledgement was received to be provided on interface 88 of radio 22. Station 40, 42 passes the local position information to rescue station or unit 48 via whatever links are most convenient. Since rescue unit 48 now has a relatively precise local position of radio 22, it may proceed directly to that location without having to perform a wide area search. This greatly facilitates rescue of or contact with the individual (or group) using radio 22 and decreases the time during which the individual (or group) using radio 22 and/or the personnel in rescue unit 48 may be exposed to a hazardous situation if, for example, rescue is being attempted during highly inclement weather or from hostile territory. While in the present example, the local position information transmitted by radio 22 is desirably used for rescue, it may also be used for other purposes.

Figure 2:
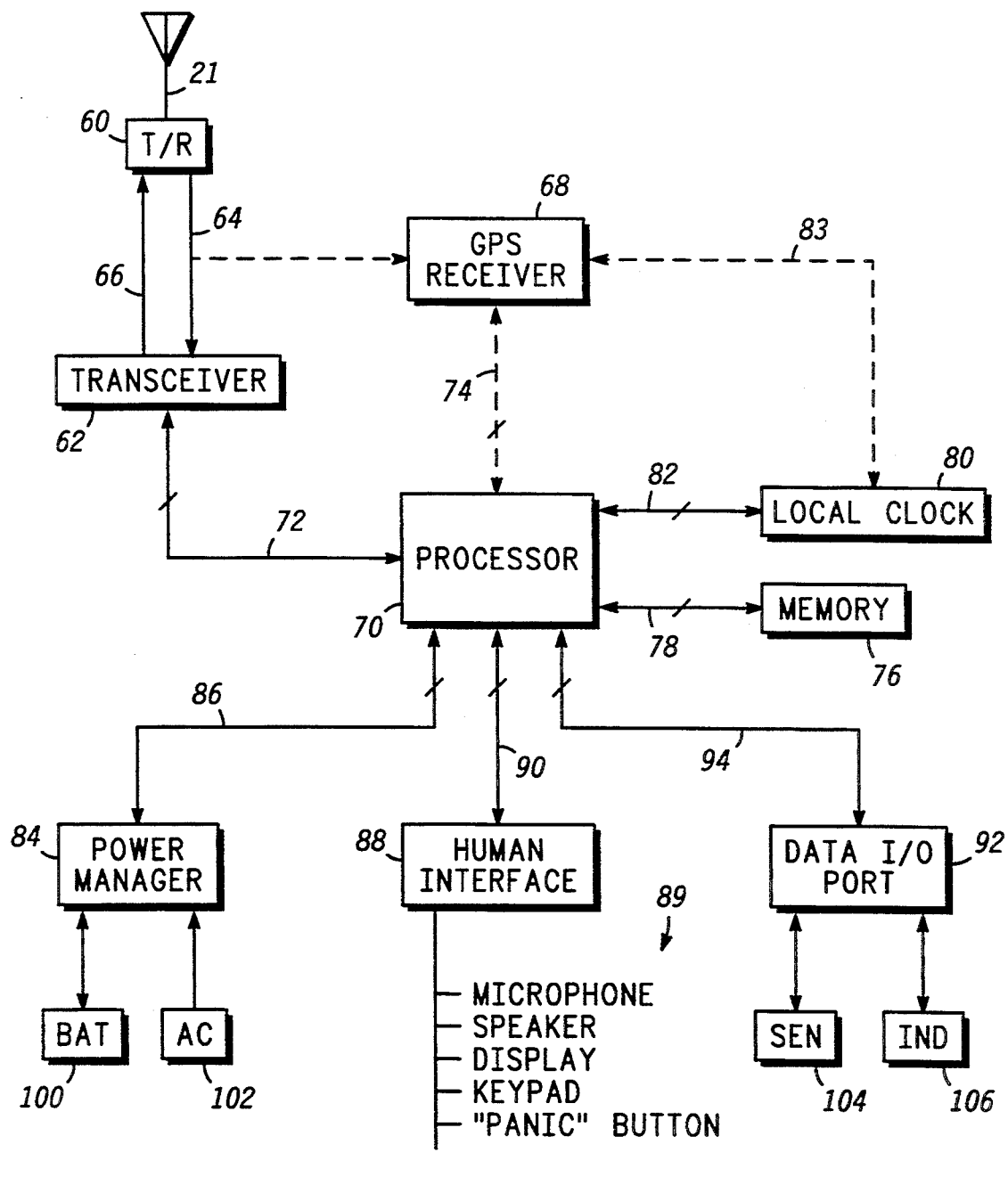
FIG. 2 shows a simplified schematic block diagram of a position locating radio having emergency signalling capabilities, according to a preferred embodiment of the present invention.

FIG. 2 shows a simplified schematic block diagram of position locating radio 22 according to a preferred embodiment of the present invention. Radio 22 comprises antenna 21 and transmit/receive (T/R) switch 60 coupled to transceiver 62 via receive and transmit links 64, 66. Where a separate geolocation receiver 68 (e.g., a GPS receiver) is included in radio 22 in order to determine the local position of radio 22 from signals provided by geolocation satellites 24, then geolocation receiver 68 is also coupled to receive link 64 from T/R switch 60. Geolocation receiver 68 also provides accurate time/frequency information based on signals derived from the highly stable master clocks/oscillators in geolocation system 24. As those of skill in the art will understand, accurate time and accurate frequency are interrelated and one may be used to obtain the other. Where geolocation information is derived directly from communication satellites 32, then geolocation receiver 68 is not necessary. In general, geolocation receiver 68 is especially useful where great position and time accuracy is desired.

Transceiver 62 and (optional) geolocation receiver 68 are coupled to data processor 70 via buses 72, 74 respectively. Data processor 70 is typically a microcomputer, as for example a Type M68HC11 microprocessor unit manufactured by Motorola, Inc., Phoenix, Ariz., but other microcomputer or computer or controller means well known in the art may also be used. Data processor 70 may contain on-board memory (e.g. RAM, ROM, PROM, EPROM, etc.) or it may be provided by memory 76 coupled to processor 70 by bus 78.

Processor 70 is coupled to real time clock 80 by bus 82. Real time clock 80 provides timing and frequency control signals to processor 70 and transceiver 62. Real time clock 80 is conveniently slaved, i.e., calibrated or corrected, using time/frequency information obtained by geolocation receiver 68 from signals 28 broadcast by geolocation means 24, or from signals broadcast from communication system 32 via link 36, transceiver 62 and processor 70. This accurate time/frequency information is optionally coupled from receiver 68 to clock 80 via line 83 or may be coupled via processor 70 via busses 74, 82. Thus, receiver 22 can have internally a precise time/frequency capability which, as will be subsequently explained is desirably used to improve overall system performance.

Processor 70 is also coupled to power manager 84 via bus 86, to human interface 88 via bus 90 and to data I/O port 92 via bus 94. Power manager 84 is in turn coupled to power supplies 100 (e.g., battery) and 102 (e.g. AC line). Power manager 84 determines the charge state of battery 100 and, when radio 22 is connected to AC supply 102, charges battery 100. Power manager 84, also via processor 70, optionally shuts down non-essential portions of radio 22 to conserve battery drain during stand-by and other situations.

Human interface 88 sends and receives data, voice and/or other messages to various human oriented I/O devices 89, such as for example, a microphone, a speaker, a display, a keypad and an emergency "panic" button for initiating an emergency alarm condition.

Data I/O port 92 is convenient but not essential. It permits radio 22 to be coupled, e.g., via a serial or parallel interface to various remote or local sensors 104 and/or indicators 106. For example, radio 22 may be used to automatically signal the existence of some alarm condition generated by remote sensor 104 coupled to data port 92, as for example, "fire", "no pulse", "unauthorized entry", "out-of-fuel", "over/under temperature/pressure", and so forth. The alarm condition signal is desirably digital. Similarly, remote indicator 106 may be for example, a computer terminal or FAX which is intended to send and/or receive data over satellite network 32 via radio 22. Means for coupling various sensors, indicators and terminals via serial or parallel ports are well known in the art.

Transceiver 62 is preferably a channelized receiver, that is, a transceiver which operates over a frequency spectrum subdivided into narrow bandwidth channels. The use of a channelized transceiver is desirable since it permits multiple units to communicate at the same time and in the same location without interference, each radio being assigned to use a particular channel at a particular time. Such assignments may be static or dynamic and may be user selected or be remotely controlled. Means and methods for channelized receivers are well known in the art.

With channelized switched communication systems, as for example, the IRIDIUM system, it is desirable to provide for a means of reliable access to the satellite communication system by radio 22 so that it can obtain priority handling of its emergency message. There are two important aspects that need to be considered, (1) emergency access message format, and (2) emergency access signal synchronization.

Figure 3:
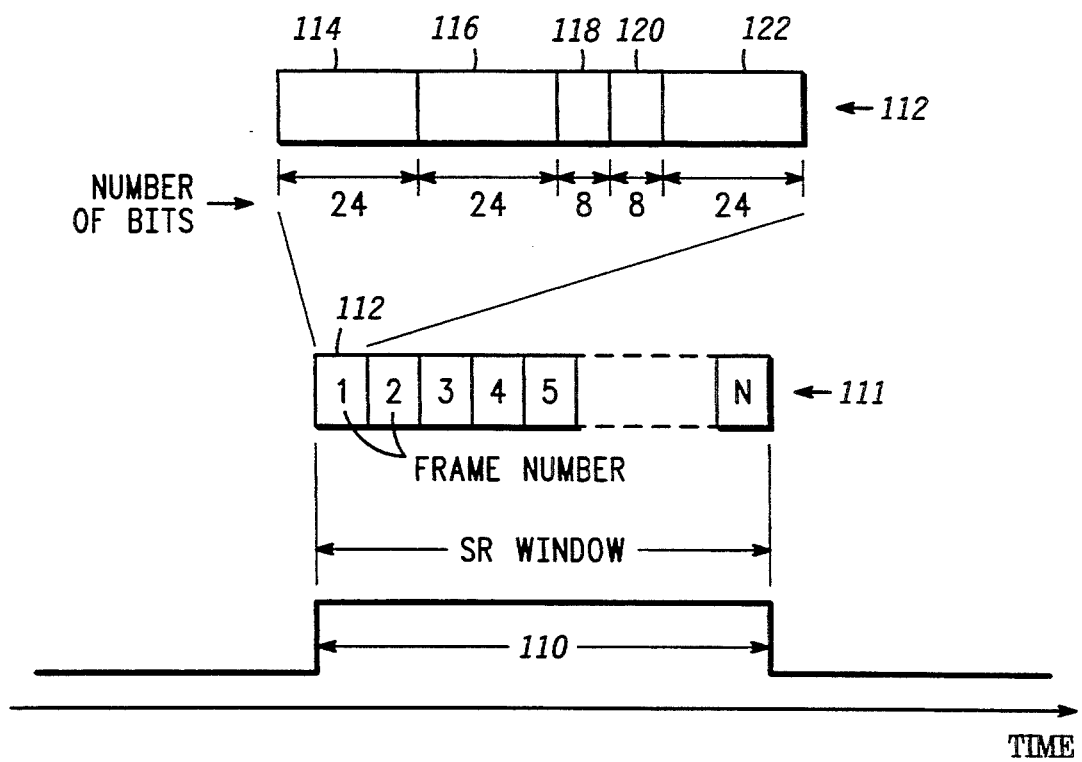
FIG. 3 shows an Emergency Access Message (EAM) form of a preferred embodiment of the present invention.

FIG. 3 illustrates a preferred embodiment of the Emergency Access Message (EAM) format. This format is suitable for use with the IRIDIUM system but may also be used with other compatible communication systems. Satellite 321 (see FIG. 1) which is in range of radio 22, has Satellite Receive (SR) time window 110 during which it listens for calls from radios 22 within its footprint. During that time window, radio 22 sends an EAM composed of N repetitions 111 of a preformatted message, that is, N repetitions of a "frame" of data 112. It is desirable that N be at least five.

In a preferred embodiment, each frame of data 112, comprises several fields, for example, preamble 114, unique word 116, an emergency indicator code 118, a frame number 120, and unit identification code 122. Suitable lengths of these fields are 24, 24, 8, 8, and 24 bits respectively for a total of 88 bits. Designating the number of bits per frame as "M", then the M bit frames are repeated N times, with each frame being identified by a frame number, for example, increasing from 1 to N.

The presence of emergency indicator code field 118 permits communication system 32 to detect that an emergency signal is being received so that, if necessary satellite 321 can direct other units within its antenna footprint to "stand-down" for a time to avoid interference with receipt of EAM 111. The inclusion of frame number field 120 enables system 32 to determine the timing error of radio 22 with respect to SR window 110 of satellite 321, and thereby send back to radio 22 a message instructing processor 70 to reset local clock 80, so that the Radio Transmit (RT) time coincides with the Satellite Receiver (SR) time and vice versa.

Having detected an EAM message, satellite 321 (and/or base station 42) sends back to radio 22 during the next Satellite Transmit (ST) window, a timing correction if needed, channel and timing window assignments on which radio 22 is to subsequently transmit and receive and the ID of radio 22 contained in field 122 of the EAM so that radio 22 can recognize the signal addressed uniquely to it and ignore others. Radio 22 then shifts its frequencies and timing in accord with the instructions from communication system 32 and begins transmitting an Emergency Data Message (EDM) during its assigned SR time window and on its assigned SR frequency. Radio 22 then listens for further information from satellite 321 ( or base station 42) on its assigned Satellite Transmit (ST) time window and ST channel frequency.

Figure 4:
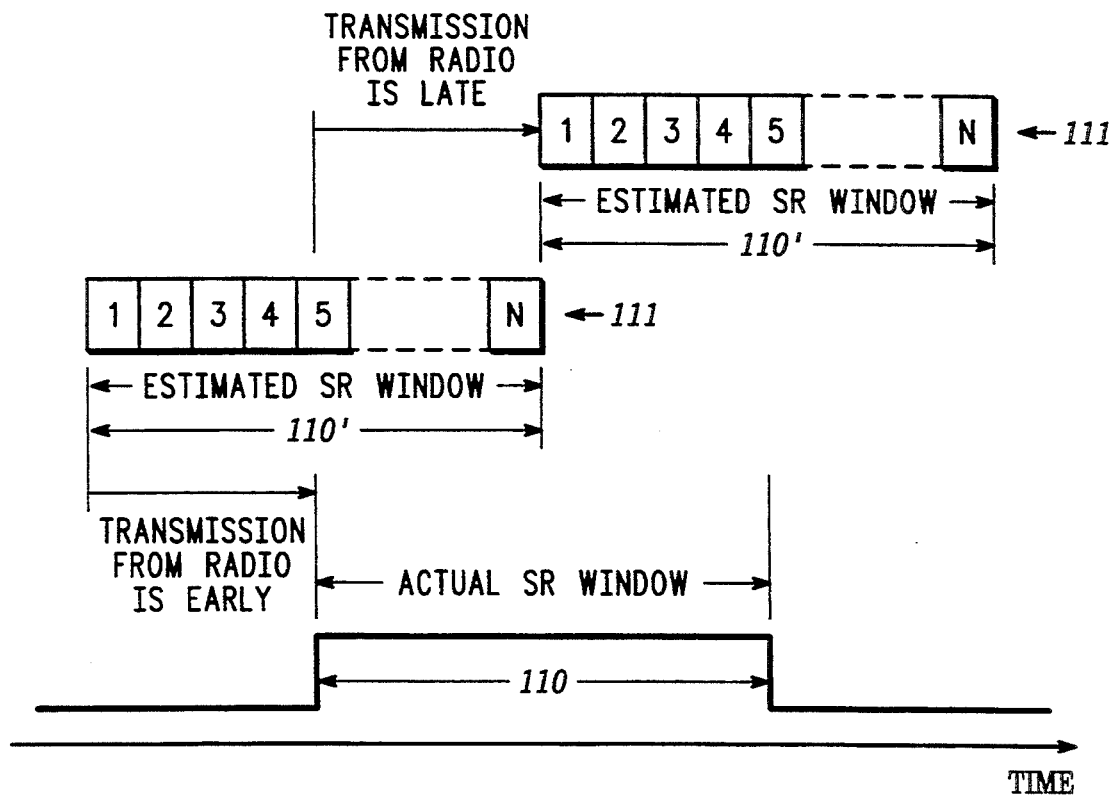
FIG. 4 shows EAM transmit timing relative to a communication system access time time window.

FIG. 4 is a timing diagram similar to FIG. 3 indicating how radio 22 arranges to insure that it transmits EAM message 111 during SR window 110 so that radio 22 and satellite 321 reliably establish communication. Because local clock 80 is generally of lower accuracy than the master clocks in satellite systems 24, 30, 32, it requires correction to insure that radio 22 hits SR window 110 of satellite 32. (MILSAT satellite 30 has no receive timing window so this is not an issue if MILSAT is used.)

Time synchronization may be accomplished in several ways. When geolocation (e.g. GPS) receiver 68 is included in radio 22 and geolocation satellites 24 are available, then a highly accurate time signal may be obtained from geolocation receiver 68 and used via link 83 or links 74, 82 to update local clock 80. However, even if geolocation receiver 68 is not included or if geolocation satellites 24 are not functioning in the particular area where radio 22 is located, signals from satellite system 32 can be used to update clock 80.

Under these circumstances, processor 70 of radio 22 provides estimate 110′ of the timing of actual SR window 110 and keys EAM message 111 to begin transmitting during interval 110′. This estimate is obtained from the last timing correction received from satellite system 32 by radio 22 and stored in memory 76, or by passively listening to satellite 321 to determine when it is transmitting and then calculating the timing of the SR window from the timing of the ST window, or from a "corrected time" determined from receiver 68.

Because EAM message comprises N repetitions of data frames 112, there is a very high probability that at least one frame 112 will lie within actual SR window 110 if EAM 111 is early or late by less than SR window duration 110. Since SR window duration 110 is about 5 ms, local clock 80 can be kept or brought in sync to that degree.

Once satellite 321 has received and acknowledged EAM 111, then radio 22 is coupled to satellite communication system 32 just as if it had placed a phone call. Radio 22 then provides an Emergency Data Message (EDM) to satellite 321 which is routed to base station 42 which has been assigned by system 32 as the recipient of emergency messages of the type generated by radio 22. The EDM includes for example, information on the local position (POS) of radio 22, time of day (TOD), and emergency status (ES) or some subset or combination thereof. This information is generated by processor 70 following prestored instructions from memory 76 plus information derived from interface 88 or 92 depending upon what alarm condition has been detected.

Figure 5:
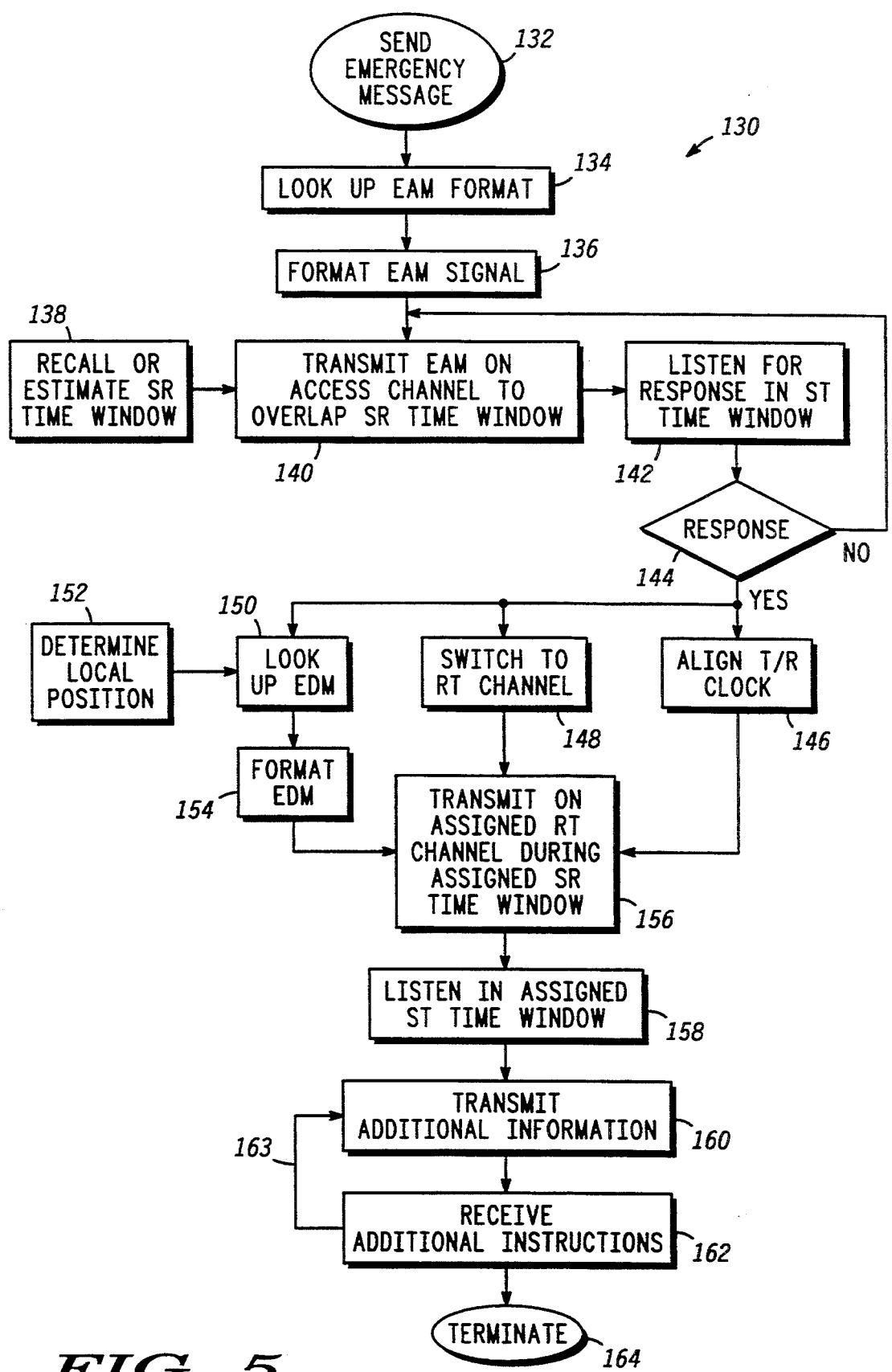
FIG. 5 shows a simplified flow chart depicting emergency signalling operation by the radio.

The operation of radio 22 will be more fully understood by reference to FIG. 5 which is a flow diagram indicating the steps 130 performed by radio 22 in response to instruction 132 (e.g. "panic button" pushed) or other alarm condition instructing radio 22 to send an emergency message. Under the control of processor 70 based on programs stored within processor 70 or in memory 76 or a combination thereof, radio 22 first retrieves the EAM format from memory, as indicated in block 134. This information is then used to format the EAM signal, as indicated in block, that is, to provide signal 111, 112 of FIG. 3.

Estimated SR window 110′ is determined in block 138. EAM 111 is then transmitted on the predetermined satellite access channel (stored in memory 76) during estimated SR window 110′ as indicated by block 140 to overlap SR window 110 (see also FIG. 4). Radio 22 then listens for a response from satellite 321 in the predetermined satellite access acknowledgement time window and channel, as indicated in block 142. As indicated in block 144, if a response is not detected ("NO") then steps 140, 142 are repeated. When a response is detected ("YES"), then the response is sent to processor 70 to align the clock as indicated in block 146, to switch the transmitter in radio 22 to its newly assigned transmit channel (if any) as indicated in block 148, and to look up the EDM information as indicated in block 150 (including local position information as provided by block 136).

The EDM information is then formatted in the manner required by communication system 32 (or by whatever communication system is being used) as indicated by block 154 and sent to transceiver 60 (see FIG. 2) where it is transmitted under the control of processor 70 on the assigned Radio Transmit (RT) channel and during correspondingly assigned SR timing window as indicated by block 156. (The RT channel and time and the SR channel and time must coincide and vice versa.) Radio 22 then listens during its assigned ST timing window and on the assigned ST channel, as indicated in block 158, and if needed transmits additional information to satellite 321 on the appropriate channel and time as indicated by block 160, then receives additional instructions from base station 42 via satellite 321 as shown in block 162 and repeats this transmit/receive process as indicated by loop-back 163, until the problem is resolved and communication is terminated in block 164.

As those of skill in the art will appreciate, the functions performed by communication system 32 including base station 42 in responding EAM 111, 112 from radio 22 may be distributed or concentrated or some combination thereof, depending upon what best suits the particular circumstances. For example, control over the transmission to and from radio 22 may be exercised autonomously by satellite 321 or controlled entirely by base station 42 or some combination thereof. From the point of view of radio 22 this does not matter. What is important is that radio 22 have the intelligence and timing accuracy to determine its local position and prepare and transmit EAM messages in a manner to overlap the access time slot of communication system 32 and be in the correct access frequency channel, so as to insure prompt access to communication system 32 and, once communication has been established, to provide an EDM message containing, among other things, the local position of radio 22 and some indication of the alarm status or situation (e.g., panic button pushed).

A highly desirable feature of the present invention is the use of a two-stage procedure for accessing and alerting an emergency rescue or response center to an alarm condition in a portable communication radio. Radio 22 first sends EAM message 111,112. This message is very brief, e.g. five repetitions of an 88 bit EAM message (e.g. 440 bits) within SR window 110. This can be transmitted by radio 22 to satellite 321 in less than 5 milliseconds. Based on EAM 112 alone, communication system 32 knows the identity of radio 22, that an alarm condition exists and that radio 22 is within the antenna footprint of particular satellite 321 and in which antenna cell of satellite 321 radio 22 is located (the antenna footprint of satellite 321 is segregated into multiple contiguous cells). Thus, even if radio 22 is then destroyed by whatever alarm condition exists, an alarm has been given and a rough location of the radio is already available after only a few milliseconds of communications.

When radio 22 receives an acknowledgement with channel assignment and timing instructions, it then transmits the EDM containing its precise local position. This process generally is accomplished in a few seconds or less. Thus, a feature of the present invention is very fast response to access an emergency center anywhere in the world.

A further highly desirable feature of the present invention is that once emergency access has been obtained, voice as well as data messages may be exchanged between radio 22 and monitoring station 42 irrespective of their relative geographic location on earth. Further, radio 22 and base station 42 need not be within view of the same satellite, but may be linked through several satellites or a combination of satellites and ground equipment. Further, since satellite communication system 32 is capable of keeping track of all other active radios in the vicinity of radio 22, i.e., their "telephone" ID numbers and locations, it can initiate a call for assistance not just to professional rescue units such as rescue unit 48 of FIG. 1, but to other satellite cellular service subscribers (ordinary persons) who might be close by and able to reach the user of radio 22 and render assistance long before a regular emergency unit might arrive.

Based on the foregoing description, it will be apparent to those of skill in the art that the present invention solves the problems and achieves the goals set forth earlier, and has substantial advantages as pointed out herein, namely, it provides a mobile radio well adapted for use as an emergency radio by means of a built-in geolocation and timing receiver which provides accurate local position and time synchronization sufficient to reliably access a global satellite communication system. The accurate local position is included automatically in a message sent out by the mobile radio operating in its emergency mode.

While the present invention has been described in terms of particular arrangement, satellites, communication systems, geolocation systems and steps, and these choices are for convenience of explanation and not intended to be limiting and, as those of skill in the art will understand based on the description herein, the present invention applies to other arrangements, satellites, communication systems, geolocation systems, and steps, and it is intended to include in the claims that follow, these and other variations as will occur to those of skill in the art based on the present disclosure.

We claim:

1. A transceiver, said transceiver being a portable radio transceiver, said transceiver comprising:
   a first radio receiver for receiving first signals from a satellite providing geolocation and timing information;
   processor means coupled to said first radio receiver, said processor means for determining, based in part on said first signals, an estimated time window when a listening satellite communication system receives access messages, said processor means providing an access message having a predetermined format including an index;
   transmitter means coupled to said processor means, said transmitter means for sending a predetermined sequence of repetitions of said access message to said satellite communication system at least partially during said estimated access time window, each access message of said predetermined sequence having a different index; and an input device for indicating an alert condition, said input device coupled to said processor means and to said transmitter means, said input device for detecting said alert condition and, when said alert condition is detected, reporting said alert condition and geolocation information describing location of said radio to said satellite communication system.

2. The transceiver of claim 1, further comprising a second receiver for receiving second signals from said satellite communication system.

3. A transceiver, said transceiver being a portable radio transceiver, said transceiver comprising:
a first radio receiver for receiving first signals from a satellite providing geolocation information;
processor means coupled to said first radio receiver, said processor means for determining an estimated time window when a listening satellite communication system receives access messages, said processor means providing an access message having a predetermined format including an index;
transmitter means coupled to said processor means, said transmitter means for sending a predetermined sequence of repetitions of said access message to said satellite communication system at least partially during said estimated access time window, each access message of said predetermined sequence having a different index; and
an input device for indicating an alert condition, said input device coupled to said processor means and to said transmitter means, said input device for detecting said alert condition and, when said alert condition is detected, reporting said alert condition and geolocation information describing location of said radio to said satellite communication system;
a second receiver for receiving a second signal from said satellite communication system; and
means for identifying an address in said second signal, said identifying means coupled to said second receiver and to a message indicator, said address identifying said transceiver as a desired recipient of said second signal and enabling said message indicator to indicate that said second signal was received.

4. A transceiver, said transceiver being a portable radio transceiver, said transceiver comprising:
a first radio receiver for receiving first signals from a satellite providing geolocation information;
processor means coupled to said first radio receiver, said processor means for determining an estimated time window when a listening satellite communication system receives access messages, said processor means providing an access message having a predetermined format including an index;
transmitter means coupled to said processor means, said transmitter means for sending a predetermined sequence of repetitions of said access message to said satellite communication system at least partially during said estimated access time window, each access message of said predetermined sequence having a different index; and
an input device for indicating an alert condition, said input device coupled to said processor means and to said transmitter means, said input device for detecting said alert condition and, when said alert condition is detected, reporting said alert condition and geolocation information describing location of said radio to said satellite communication system;
a second receiver for receiving a second signal from said satellite communication system; and
means for detecting a portion of said second signal, said detecting means coupled to said second receiver and to said processor means, said portion indicating that a base station coupled to said satellite communication system has received position information transmitted by said transceiver.

5. The transceiver of claim 4, further comprising means for indicating receipt of said portion indicating that said base station has received said position information transmitted by said transceiver, said indicating means coupled to said detecting means.

6. A radio, said radio being a hand-portable radio, said radio comprising:
a global positioning system (GPS) receiver responsive to GPS satellites for receiving therefrom information permitting said radio to determine its local position;
a device for indicating an alert condition;
a transceiver for exchanging messages with a listening satellite communication system; and
a processor coupled to said device, said transceiver and said GPS receiver for (i) determining in part based on information from said GPS receiver an estimated time window when said listening satellite communication system is able to receive messages, (ii) providing to said transceiver a sequence of repeated access request messages for transmission to said listening satellite communication system during at least a portion of said estimated time window, wherein each of said repeated access request messages in said sequence contains a index, (iii) after said transceiver receives an acknowledgment message from said satellite communication system containing an indication of which index was received by said satellite communication system, correcting said estimated time window and (iv) transmitting a message containing said alert condition and local position information during said corrected time window.

7. The radio of claim 6, wherein said acknowledgement message contains an address identifying said radio.

8. The radio of claim 7, wherein said processor further comprises means for detecting said address identifying said radio, said address being included in the access acknowledgement message so that the transmission of said local position information is initiated thereby.

9. A radio, said radio being a hand-portable radio, said radio comprising:
a global positioning system (GPS) receiver responsive to GPS satellites for receiving therefrom information permitting said radio to determine its local position;
transceiver means coupled to said GPS receiver, said transceiver means for communicating with one or more remote stations via a transceiver satellite, by sending digital information containing said local position to said one or more remote stations via said transceiver satellite and receiving therefrom an acknowledgement that said local position has been received;

annunciator means coupled to said transceiver means, said annunciator means for providing an indication of received messages;

processor means coupled to said transceiver means and said annunciator means, said processor means for receiving said acknowledgement from said transceiver means and generating an output signal to actuate said annunciator means to indicate that said acknowledgement was received; and an input device for indicating an alert condition, said input device coupled to said processor means and to said transceiver means, said input device for detecting said alert condition and, when said alert condition is detected, reporting geolocation information describing location of said radio and said alert condition to said one or more remote stations;

clock means coupled to said processor means, said clock means for maintaining local radio time;

memory means coupled to said processor means, said memory means for storing information describing relative timing of transceiver satellite transmit and receive times; and wherein said processor means further comprises:

computation means coupled to and responsive to the clock means, said computation means for determining actual local radio time when said transceiver satellite broadcasts and for combining relative timing information from said memory means with observed actual local radio time when said transceiver satellite broadcasts, in order to estimate therefrom local radio time intervals when said transceiver satellite is able to receive messages transmitted from said radio.

10. In a radio frequency communications system comprising a radio and a satellite communication system, the satellite communications system comprising a constellation of communications satellites, a method for communicating an alert condition existing at the radio, said method comprising steps of:

retrieving an emergency access message (EAM) format from a local store within the radio in response to an alert condition;

estimating or recalling from memory an anticipated satellite communication system receive time window;

transmitting an EAM signal having the EAM format to the satellite communication system during at least part of the anticipated satellite communication system receive time window;

waiting for a response during a satellite communication system transmit time window;

detecting a response from the satellite communication system;

aligning an internal clock in the radio to provide a radio transmit time window substantially coinciding with a subsequent satellite communication system receive time window;

providing an emergency data message (EDM) including the local position of the radio; and transmitting the EDM containing the local position of the radio to the satellite communication system during the subsequent satellite communication system receive time window.

11. In a radio frequency communications system comprising a radio and a satellite communication system, wherein the radio comprises a portable radio including a memory, a processor, a transmitter, a receiver and a clock for keeping internal time, and wherein the satellite communications system comprises a constellation of communications satellites, a method for communicating an alert condition existing at the radio, said method comprising steps of:

recalling a satellite communication system access message format from the memory;

estimating by the processor an access message receive time window and a response transmit time window for the satellite communication system;

transmitting by the transmitter an access message having the satellite communication system access message format to the satellite communication system during at least part of the estimated satellite communication system receive time window;

waiting for a response during the satellite communication system transmit time window;

correcting by the processor internal time in the clock to provide a subsequent radio transmit time window substantially coinciding with a subsequent satellite communication system receive time window when a response is received by the receiver from the satellite communication system; and transmitting by the transmitter a data message containing information on local position of the radio to the satellite communication system during the satellite communication system receive time window.

12. The method of claim 11 further comprising, prior to said second transmitting step, a step of determining a local position of the radio using information from a GPS receiver within the radio.

13. The method of claim 12, wherein said step of estimating an access message receive time window for the satellite communication system comprises steps of:

(i) correcting local time in the radio using time information derived from the GPS receiver;

(ii) retrieving from the memory information describing transmit and receive times for the communications satellites expected to be visible to the radio depending upon its local position; and (iii) calculating therefrom the local time in the radio when the access message receive time window occurs for visible communications satellites of the satellite communication system.

14. The method of claim 11, wherein said step of estimating an anticipated access message receive time window for the satellite communication system comprises steps of:

(i) detecting broadcasts from the satellite communication system to locally determine broadcast times when such broadcasts occur;

(ii) comparing observed broadcast times with information stored in the radio describing intervals between transmit and receive time windows of the satellite communication system; and (iii) calculating therefrom a local time in the radio when the anticipated access message receive time window for the satellite communication system occurs.

15. The method of claim 11, wherein said steps of recalling an access message format and transmitting an access message comprise steps of:

providing an access message format including a time related variable from the memory; and transmitting by the transmitter multiple repetitions of the access message wherein each of the multiple repetitions has a different value of the time related variable, thereby allowing a satellite receiving one or more of the multiple repetitions to detect time displacement between a radio transmit time window and a satellite communication system receive time window, so that a response message sent to the radio can contain time difference information for subsequent use in said step of correcting internal time in the radio.

16. A radio, said radio being a hand-portable radio, said radio comprising:

a global positioning system (GPS) receiver responsive to GPS satellites for receiving therefrom information permitting said radio to determine its local position;

transceiver means coupled to said GPS receiver, said transceiver means for communicating with one or more remote stations via a transceiver satellite, by sending digital information containing said local position to said one or more remote stations via said transceiver satellite and receiving therefrom an acknowledgement that said local position has been received;

annunciator means coupled to said transceiver means, said annunciator means for providing an indication of received messages;

processor means coupled to said transceiver means and said annunciator means, said processor means for receiving said acknowledgement from said transceiver means and generating an output signal to actuate said annunciator means to indicate that said acknowledgement was received; and an input device for indicating an alert condition, said input device coupled to said processor means and to said transceiver means, said input device for detecting said alert condition and, when said alert condition is detected, reporting geolocation information describing location of said radio and said alert condition to said one or more remote stations, wherein said processor means further includes:

means for providing a priority access message having a predetermined format; and means for actuating said transceiver means to cause said transceiver means to transmit at least N repetitions of said priority access message, each of said at least N repetitions containing variable data identifying when within said at least N repetitions it was transmitted.

17. The radio of claim 16, wherein said processor means further includes means for adjusting, based on a timing correction signal received by said transceiver from said transceiver satellite, a time of transmission of a subsequent data message to said transceiver satellite to more closely match a reception time window of said transceiver satellite, said timing correction signal being based in part on said variable data included in said priority access message, said adjusting means coupled to said transceiver means and to said processor means.

18. A communication system comprising:
one or more satellites;
a radio, said radio comprising a portable radio for communicating with said one or more satellites, said radio comprising:

a geolocation receiver for providing geolocation information;

a transceiver for sending and receiving messages;

a memory for storing message format information;

a local clock for providing local time information;

a processor for controlling said transceiver, memory and clock such that said processor retrieves from said memory an access message format comprising a time index and said processor actuates said transceiver to broadcast multiple repetitions of an access message, each of said multiple repetitions having a different value of said time index, and subsequent to a response received from said one or more satellites via the transceiver, corrects time obtained from said local clock to provide substantial coincidence of a radio transmit time and a satellite receive time for a subsequent data message; and an input device for indicating an alert condition, said input device coupled to said processor and to said transceiver, said input device for detecting said alert condition and, when said alert condition is detected, reporting said alert condition and geolocation information describing location of said radio to said satellite communication system via said transceiver.

19. The system of claim 18, wherein said processor further receives current local position information of said radio from said geolocation receiver and incorporates current local position information in a message sent to said one or more satellites by said transceiver.

20. A radio, said radio comprising a portable communication system radio for communicating with one or more satellites, said radio comprising:

a geolocation receiver for providing geolocation information;

a transceiver for sending and receiving messages to the one or more satellites;

a memory for storing message format information;

a local time base for providing local time information; and a processor for controlling said transceiver, memory and time base such that said processor retrieves from said memory an access message format comprising a time index and actuates said transceiver to broadcast multiple repetitions of an access message, each repetition having a different value of said time index, and subsequent to receipt of a response from said one or more satellites received via said transceiver, said processor corrects time obtained from said local time base to provide substantial coincidence of a radio transmit time and a satellite receive time for a subsequent data message; and an input device for indicating an alert condition, said input device coupled to said processor and to said transceiver, said input device for detecting said alert condition and, when said alert condition is detected, reporting said alert condition and geolocation information describing location of said radio to said satellite communication system said transceiver.

21. The radio of claim 20, wherein said processor further receives current local position information of said radio from said geolocation receiver and incorporates current local position information in a message sent to said one or more satellites by said transceiver.

* * * * *